United States Patent
Yamamoto

(10) Patent No.: US 9,641,269 B2
(45) Date of Patent: May 2, 2017

(54) APPARATUS AND METHOD FOR SYNCHRONIZING CLOCKS AMONG COMMUNICATION DEVICES

(71) Applicant: FUJITSU LIMITED, Kawasaki-shi, Kanagawa (JP)

(72) Inventor: Kanta Yamamoto, Kokubunji (JP)

(73) Assignee: FUJITSU LIMITED, Kawasaki (JP)

( * ) Notice: Subject to any disclaimer, the term of this patent is extended or adjusted under 35 U.S.C. 154(b) by 130 days.

(21) Appl. No.: 13/971,015

(22) Filed: Aug. 20, 2013

(65) Prior Publication Data

US 2014/0119391 A1    May 1, 2014

(30) Foreign Application Priority Data

Oct. 31, 2012    (JP) ................. 2012-240855

(51) Int. Cl.
H04J 3/06    (2006.01)

(52) U.S. Cl.
CPC .......... *H04J 3/0688* (2013.01); *H04J 3/0697* (2013.01); *H04J 3/0667* (2013.01)

(58) Field of Classification Search
None
See application file for complete search history.

(56) References Cited

U.S. PATENT DOCUMENTS

| | | | |
|---|---|---|---|
| 2010/0172453 A1* | 7/2010 | Cankaya | H04J 3/0641 375/355 |
| 2011/0022734 A1* | 1/2011 | Etheridge et al. | 709/248 |
| 2011/0228888 A1* | 9/2011 | Gelter et al. | 375/371 |
| 2012/0079310 A1 | 3/2012 | Matsusue et al. | |
| 2012/0263264 A1* | 10/2012 | Peng | 375/355 |
| 2013/0077964 A1* | 3/2013 | Mani | 398/34 |
| 2013/0100832 A1* | 4/2013 | Flinn et al. | 370/252 |

FOREIGN PATENT DOCUMENTS

| | | |
|---|---|---|
| JP | 2001-60940 | 3/2001 |
| JP | 2012-74799 | 4/2012 |

OTHER PUBLICATIONS

Technical Committee on Sensor Technology (TC-9) of the IEEE Instrumentation and Measurement Society, *IEEE Standard for a Precision Clock Synchronization Protocol for Networked Measurement and Control Systems (IEEE Std 1588™—2008)*, The Institute of Electrical and Electronics Engineers, Inc., 2008.

Japanese Office Action dated Jun. 7, 2016 in corresponding Japanese Patent Application No. 2012-240855.

* cited by examiner

*Primary Examiner* — Huy D Vu
*Assistant Examiner* — Hong Shao
(74) *Attorney, Agent, or Firm* — Staas & Halsey LLP

(57) ABSTRACT

A packet transmission device includes first and second clocks, a communication unit, and first and second synchronization processing units. The communication unit transmits and receives a synchronization packet to and from an external time source device. The first synchronization processing unit synchronizes the first clock with the external time source device in accordance with time information of the synchronization packet. The second synchronization processing unit synchronizes the second clock with the first clock.

5 Claims, 9 Drawing Sheets

APPARATUS AND METHOD FOR SYNCHRONIZING CLOCKS AMONG COMMUNICATION DEVICES

CROSS-REFERENCE TO RELATED APPLICATION

This application is based upon and claims the benefit of priority of the prior Japanese Patent Application No. 2012-240855, filed on Oct. 31, 2012, the entire contents of which are incorporated herein by reference.

FIELD

The embodiments discussed herein are related to apparatus and method for synchronizing clocks among communication devices.

BACKGROUND

IEEE1588 has been proposed as a technique for synchronizing time of devices on a network in the precision less than a microsecond. A synchronization method by the IEEE1588 is realized by a grand master mode device, a boundary clock mode device, and an ordinary clock mode device, for example. The grand master mode device is directly connected to an accurate time source, such as a global positioning system (GPS) satellite, a standard wave, and an atomic clock. The boundary clock mode device relays time information which is transmitted from the grand master mode device. The ordinary clock mode device terminates the time information which is transmitted from the grand master mode device.

The grand master mode device receives time of day (TOD) and a pulse per second (PPS) from an accurate time source such as a GPS satellite so as to synchronize time thereof. On the other hand, the boundary clock mode device and the ordinary clock mode device transmit a PTP packet for inquiring time to the grand master mode device by using the precision time protocol (PTP) at arbitrary timing.

The grand master mode device receives the PTP packet for inquiry. The grand master mode device transmits a PTP packet for time notification including TOD and a PPS to the boundary clock mode device and the ordinary clock mode device, after time-stamping transmission time of the PTP packet for time notification.

The boundary clock mode device and the ordinary clock mode device calculate delay time on a transmission channel by using the timestamp on the transmission of the PTP packet for inquiry and the timestamp of the PTP packet for time notification. The boundary clock mode device and the ordinary clock mode device perform time-correction with respect to time of the PTP packet for time notification which is transmitted from the grand master mode device, so as to synchronize time thereof.

"IEEE Standard for a Precision Clock Synchronization Protocol for Networked Measurement and Control Systems" IEEE Std 1588-2008 is an example of related art.

SUMMARY

According to an aspect of the invention, an apparatus includes first and second clocks, a communication unit, and first and second synchronization processing units. The communication unit transmits and receives a synchronization packet to and from an external time source device. The first synchronization processing unit synchronizes the first clock with the external time source device in accordance with time information of the synchronization packet. The second synchronization processing unit synchronizes the second clock with the first clock.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In a time synchronization network, a master device which supplies time information is made redundant, thereby improving reliability. However, time fluctuates instantaneously at switching of active master devices, degrading synchronization quality in the time synchronization network. It is preferable to provide a device and a method which reduce degradation of synchronization quality in switching of active master devices.

1. First Embodiment

Figure 1:
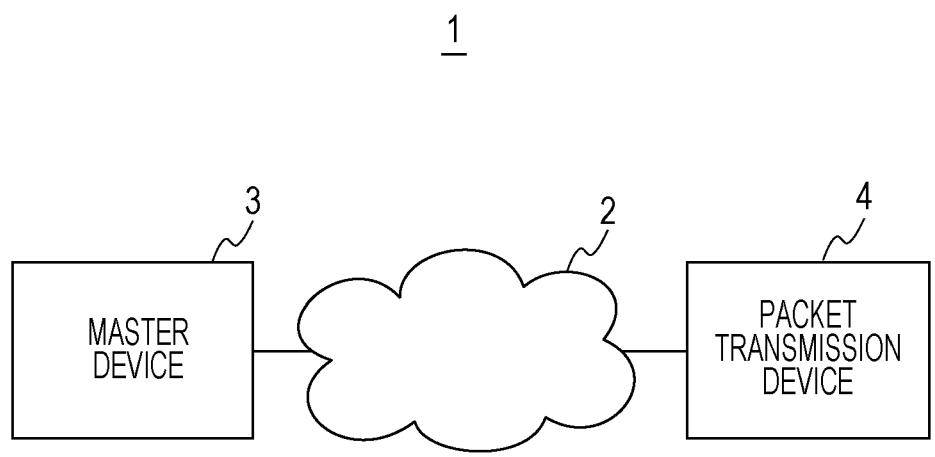
FIG. 1 is a diagram illustrating a configuration example of a communication system, according to an embodiment.

A preferable embodiment is described below with reference to the accompanying drawings. FIG. 1 is a diagram illustrating a configuration example of a communication system, according to an embodiment. A communication system 1 includes a network 2, a master device 3, and a packet transmission device 4. The packet transmission device 4 transmits and receives a packet in which time information is stored, to and from the master device 3 in accordance with a predetermined time synchronization protocol, so as to synchronize time of a clock included in the packet transmission device 4 with time of a clock of the master device 3. The master device 3 is an example of an external time source device.

In the following description, exemplification in which a precision time protocol (PTP) which is proposed in the IEEE1558 is used as the time synchronization protocol is taken up. However, in this exemplification, it is not intended that a device, a method, and a communication system that are described in this specification are limitedly applied to a device, a method, and a communication system that use the PTP. The device, the method, and the communication system described in this specification may use a network time protocol (NTP) or a simple network time protocol (SNTP), for example. The device, the method, and the communication system described in this specification are widely applicable to a device, a method, and a communication system in which a packet storing time information is transmitted and received in accordance with a predetermined time synchronization protocol so as to synchronize time among devices.

Figure 2:
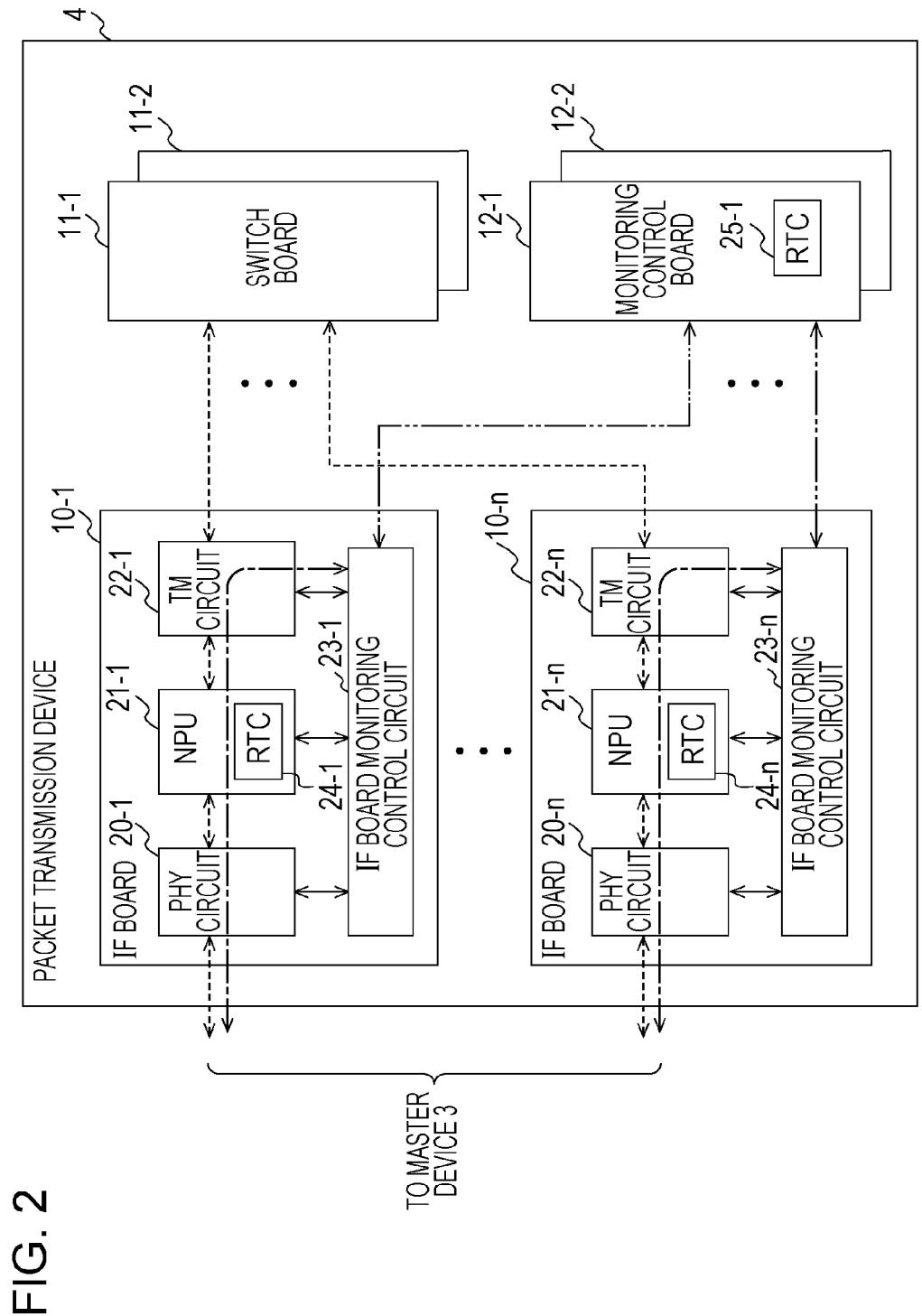
FIG. 2 is a diagram illustrating an example of a hardware configuration of a packet transmission device, according to an embodiment.

FIG. 2 is a diagram illustrating an example of a hardware configuration of a packet transmission device, according to an embodiment. The packet transmission device 4 includes interface boards 10-1 to 10-$n$, switch boards 11-1 and 11-2, and monitoring control boards 12-1 and 12-2. An interface board may be expressed also as an "IF board" in the following description and the accompanying drawings. The IF boards 10-1 to 10-$n$ are an example of a communication unit.

Here, the hardware configuration depicted in FIG. 2 is merely an exemplification for describing the embodiment. The packet transmission device 4 described in this specification may employ any other hardware configurations as long as the configurations execute the following operations.

The IF boards 10-1 to 10-$n$ hold a line interface. The IF board 10-1 includes a physical (PHY) circuit 20-1, a network processor unit (NPU) 21-1, a traffic management circuit 22-1, and an IF board monitoring control circuit 23-1. In the following description and the accompanying drawings, a traffic management circuit may be also expressed as a "TM circuit".

The PHY circuit 20-1 performs physical signal processing. The NPU 21-1 performs packet forwarding processing. Further, the NPU 21-1 is capable of appending timestamps of reception time and transmission time to a PTP packet. The NPU 21-1 includes a clock called a real time clock (RTC) for timestamp processing. The NPU 21-1 appends a timestamp of time exhibited by the RTC 24-1 to a PTP packet. The RTC 24-1 is an example of a third clock.

The TM circuit 22-1 performs packet traffic control processing. A packet which is processed in the TM circuit 22-1 is transmitted to the switch board 11-1 or 11-2 so as to be switched to an interface board which is a destination. The packet transmission device 4 has the redundant configuration to use either one of the switch boards 11-1 and 11-2 as an active switch board and make the other switch board stand by as a standby switch board.

The IF board monitoring control circuit 23-1 performs various types of monitoring control processing in the IF board 10-1. A packet which is transmitted/received in PTP communication is time-stamped in the NPU 21-1 and terminated in the IF board monitoring control circuit 23-1. The IF board monitoring control circuit 23-1 performs transmission/reception processing of a PTP packet and transmits timestamp information which is acquired in the PTP communication with the master device 3 to the monitoring control boards 12-1 and 12-2. Here, in FIG. 2, a dashed line represents a flow of a packet in which a main signal is stored, a dashed-dotted line represents a flow of a PTP packet, and a dashed-two dotted line represents a flow of timestamp information.

Other IF boards 10-$n$ also have the configurations same as the configuration of the IF board 10-1 and include a PHY circuit 20-$n$, a NPU 21-$n$, a traffic management circuit 22-$n$, an IF board monitoring control circuit 23-$n$, and a RTC 24-$n$.

The monitoring control boards 12-1 and 12-2 perform monitoring and control of a state of the packet transmission device. The packet transmission device 4 has the redundant configuration to use either one of the monitoring control boards 12-1 and 12-2 as an active monitoring control board and make the other monitoring control board stand by as a standby monitoring control board. In the following description, it is assumed that the monitoring control board 12-1 operates as an active monitoring control board and the monitoring control board 12-2 stands by as a standby monitoring control board.

The active monitoring control board 12-1 includes a RTC 25-1. The active monitoring control board 12-1 executes PTP software algorithm processing in accordance with timestamp information which is received from the IF board monitoring control circuit 23-1 so as to synchronize time of the RTC 25-1 with time of the master device 3. The standby monitoring control board 12-2 also includes a RTC in the same fashion, and synchronizes time of the RTC with time of the master device 3 in accordance with the timestamp information which is received from the IF board monitoring control circuit 23-1.

The active monitoring control board 12-1 outputs TOD information indicating the time of the RTC 25-1 and a PPS signal to the IF board 10-1. The TOD information is time and date information. The PPS signal is a signal indicating a phase for each second and indicating change timing of seconds by a rising edge. The IF board monitoring control circuit 23-1 synchronizes the RTC 24-1 of the IF board 10-1 with the RTC 25-1 of the active monitoring control board 12-1. Therefore, time of the RTC 24-1 of the IF board 10-1 depends on the RTC 25-1 of the active monitoring control board 12-1. In a similar fashion, TOD information and a PPS signal are outputted to other IF boards 10-$n$ as well, and RTCs 24-$n$ of other IF boards 10-$n$ are synchronized with the RTC 25-1.

Figure 3:
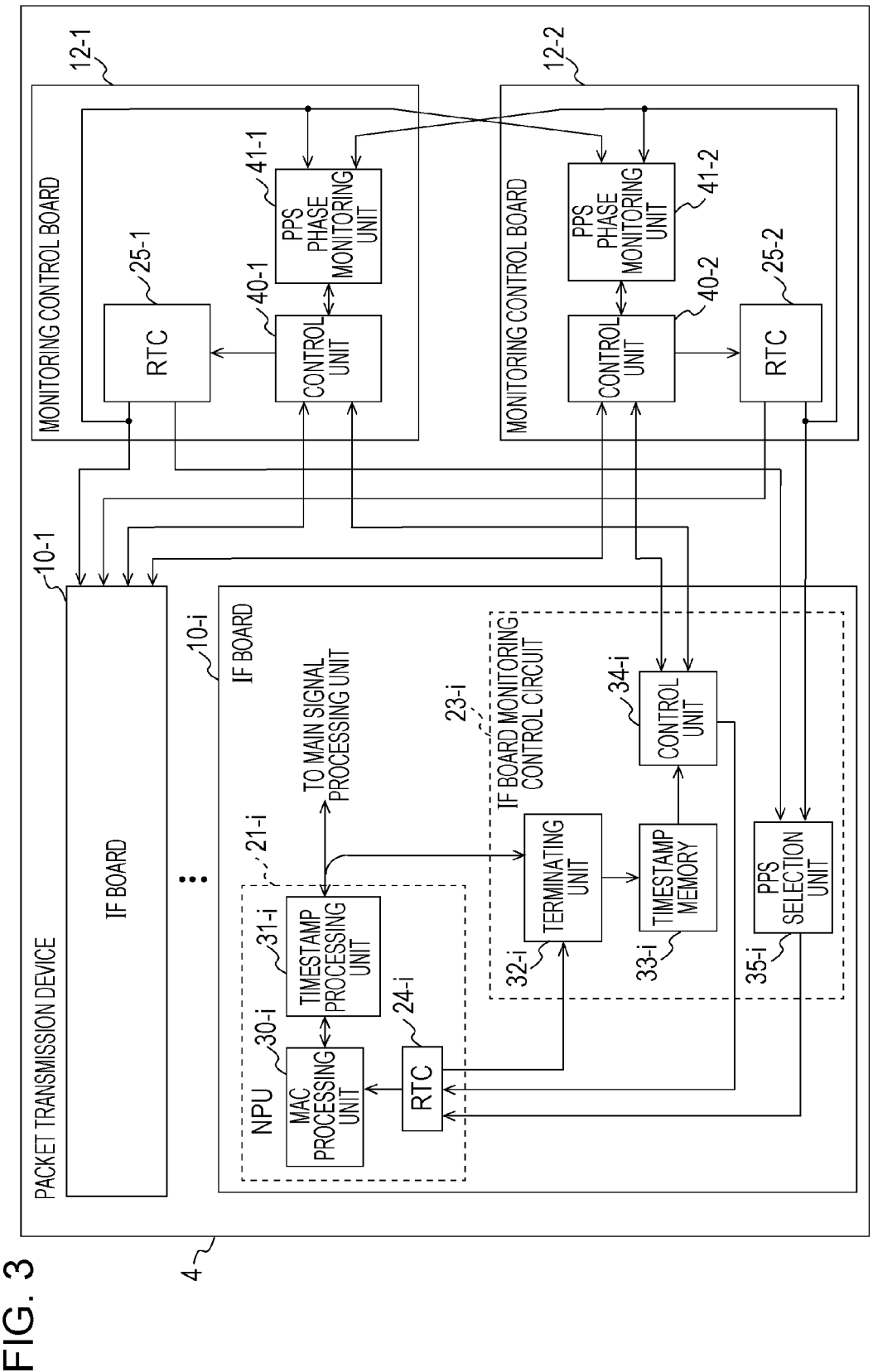
FIG. 3 is a diagram illustrating an example of a functional configuration of a packet transmission device, according to an embodiment.

FIG. 3 is a diagram illustrating an example of a functional configuration of a packet transmission device, according to an embodiment. An IF board 10-$i$ includes a RTC 24-$i$, a media access control (MAC) processing unit 30-$i$, a timestamp processing unit 31-$i$, a terminating unit 32-$i$, a timestamp memory 33-$i$, a control unit 34-$i$, and a PPS selection unit 35-$i$. The functional configuration diagram of FIG. 3 mainly illustrates the configuration related to a function of the packet transmission device 4 which is described in this specification. The packet transmission device 4 may include constituent elements other than the constituent elements which are depicted. The same goes for a functional configuration diagram of FIG. 8.

Operations of the RTC 24-$i$, the MAC processing unit 30-$i$, and the timestamp processing unit 31-$i$ may be executed by the NPU 21-$i$. Operations of the terminating unit 32-$i$, the control unit 34-$i$, and the PPS selection unit 35-$i$ may be realized by the IF board monitoring control circuit 23-$i$. The IF board monitoring control circuit 23-$i$ may include a central processing unit (CPU) which executes the operation of the control unit 34-$i$. FIG. 3 illustrates the functional configuration of the IF board 10-$i$ among the IF boards 10-1 to 10-$n$. However, the IF boards 10-1 to 10-$n$ may have the same functional configurations.

The active monitoring control board 12-1 includes the RTC 25-1, a control unit 40-1, and a PPS phase monitoring unit 41-1. The standby monitoring control board 12-2 includes a RTC 25-2, a control unit 40-2, and a PPS phase monitoring unit 41-2. The active monitoring control board 12-1 and the standby monitoring control board 12-2 may include CPUs which respectively execute operations of the control units 40-1 and 40-2.

The RTCs 25-1 and 25-2 are examples of a first clock and a second clock. The monitoring control boards 12-1 and 12-2 are examples of a first synchronization processing unit and a second synchronization processing unit. A PPS signal indicating time of the RTC 25-1 is an example of a first reference timing signal and a PPS signal indicating time of the RTC 25-2 is an example of a second reference timing signal. The control unit 40-2 is an example of a correction unit.

The MAC processing unit 30-i executes protocol processing in a medium access control layer for packet transmission/reception. The timestamp processing unit 31-i appends a timestamp to a PTP packet. The terminating unit 32-i performs transmission/reception processing of a PTP packet and stores timestamp information in the timestamp memory 33-i. The timestamp information is information indicating transmission time and reception time of a PTP packet.

The control unit 34-i reads timestamp information from the timestamp memory 33-i and transmits the timestamp information to the active monitoring control board 12-1 and the standby monitoring control board 12-2.

The control unit 40-1 of the active monitoring control board 12-1 executes the PTP software algorithm processing in accordance with timestamp information received from the IF board monitoring control circuit 23-i so as to adjust time and a frequency of the RTC 25-1. In a similar manner, the control unit 40-2 of the standby monitoring control board 12-2 executes the PTP software algorithm processing in accordance with the timestamp information received from the IF board monitoring control circuit 23-i so as to adjust time and a frequency of the RTC 25-2.

The control unit 34-i receives TOD information of the RTC 25-1 from the control unit 40-1 of the active monitoring control board 12-1 and adjusts time of the RTC 24-i. The PPS selection unit 35-i selects a PPS signal of the RTC 25-1 of the active monitoring control board 12-1 between PPS signals of the RTC 25-1 and the RTC 25-2 so as to input the PPS signal of the RTC 25-1 into the RTC 24-i. The RTC 24-i adjusts time on the basis of the selected PPS signal.

The active monitoring control board 12-1 and the standby monitoring control board 12-2 are supplied with the same timestamp information and execute the same PTP software algorithm processing. Further, the control units 40-1 and 40-2 exhibit the same hardware performance. Accordingly, TOD information and phases of PPS signals of the RTC 25-1 and the RTC 25-2 are same as each other.

However, a gap between a phase of the PPS signal of RTC 25-1 and a phase of the PPS signal of the RTC 25-2 may be generated due to individual variability of RTCs and bias between loads on the active monitoring control board 12-1 and the standby monitoring control board 12-2.

A gap between phases of the PPS signals of the RTC 25-1 and RTC 25-2 causes fluctuation of time of the packet transmission device 4 instantaneously when the active monitoring control board is switched to the monitoring control board 12-2, degrading time synchronization performance and quality of the packet transmission device 4. For example, when time of the packet transmission device 4 is used for measurement of delay of packet transmission, a measurement error is generated due to fluctuation of the packet transmission device 4.

Therefore, the packet transmission device 4 monitors a phase difference between the PPS signals of the RTC 25-1 and the RTC 25-2 by the PPS phase monitoring unit 41-2 so as to adjust the time and the frequency of the RTC 25-2 in accordance with the phase difference. When the monitoring control board 12-1 stands by as a standby monitoring control board, the packet transmission device 4 monitors a phase difference between the PPS signals of the RTC 25-1 and the RTC 25-2 by the PPS phase monitoring unit 41-1 so as to adjust the time and the frequency of the RTC 25-1.

Figure 4:
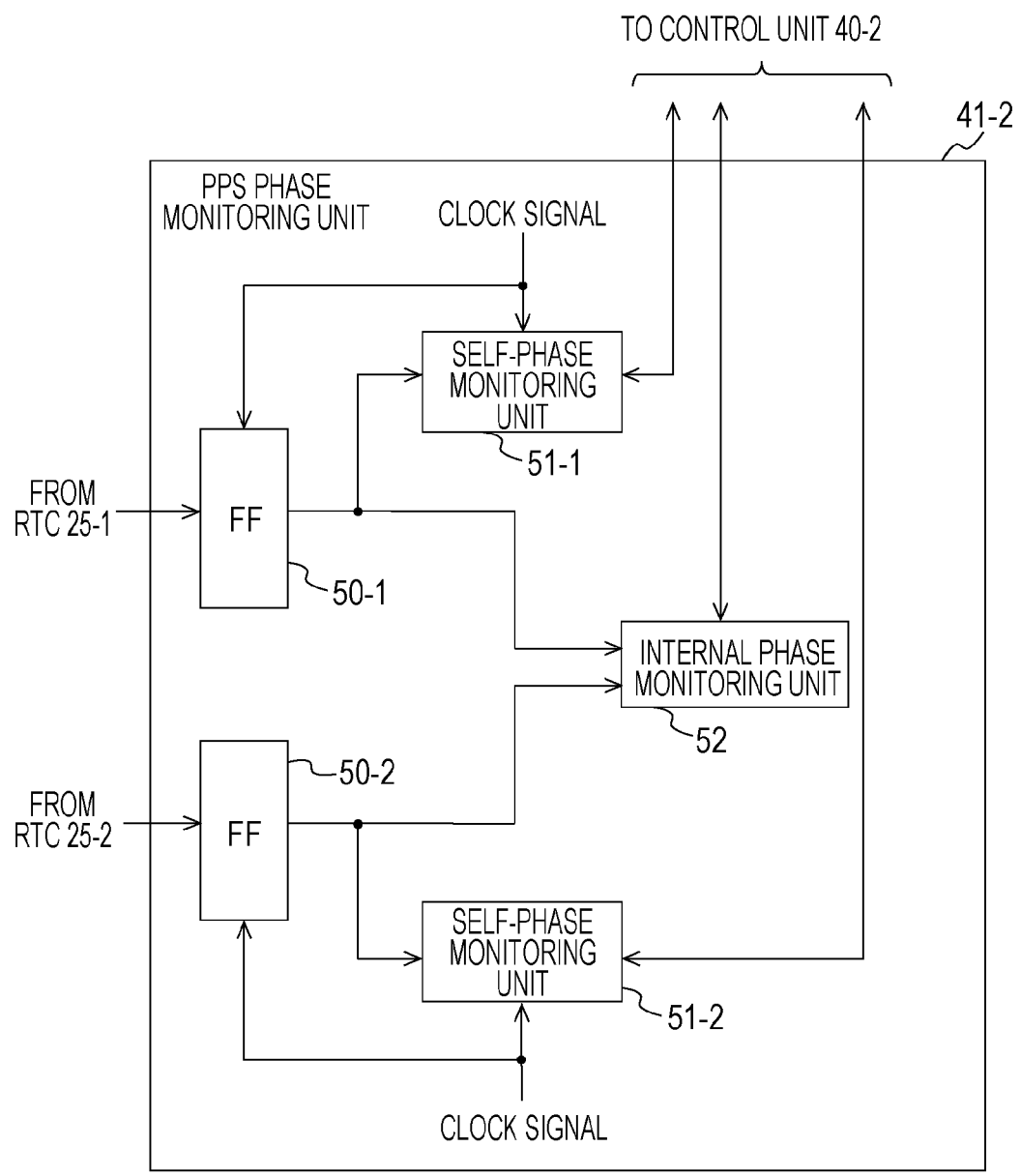
FIG. 4 is a diagram illustrating an example of a functional configuration of a pulse per second (PPS) phase monitoring unit, according to an embodiment.

FIG. 4 is a functional configuration diagram of a first example of the PPS phase monitoring unit 41-2. The PPS phase monitoring unit 41-2 includes flip-flops 50-1 and 50-2, self-phase monitoring units 51-1 and 51-2, and an internal phase monitoring unit 52. The PPS phase monitoring unit 41-1 also has the same configuration. In the following description and accompanying drawings, a flip-flop may be expressed as a "FF". The self-phase monitoring units 51-1 and 51-2 are examples of a first monitoring unit and a second monitoring unit. The internal phase monitoring unit 52 is also an example of a phase difference detection unit.

The flip-flop 50-1 samples the PPS signal of the RTC 25-1 by a received clock signal. For example, when a frequency of a clock signal is 100 MHz, a rising edge cycle of the PPS signal corresponds to $10^6$ pieces of clocks. The self-phase monitoring unit 51-1 detects how many clocks a phase of an actual rising edge is shifted with respect to a phase of the next rising edge expected from a rising edge of the previous PPS signal.

The self-phase monitoring unit 51-1 stores a maximum value of each of a phase shift amount in a positive direction which is a direction in which an edge cycle becomes longer and a phase shift amount in a negative direction which is a direction in which the edge cycle becomes shorter. The flip-flop 50-2 also samples the PPS signal of the RTC 25-2, and the self-phase monitoring unit 51-2 detects fluctuation of a phase of the PPS signal of the RTC 25-2 so as to store maximum values of phase shift amounts in the positive direction and the negative direction.

The self-phase monitoring units 51-1 and 51-2 output the maximum value of the phase shift amount of the PPS signal of the RTC 25-1 and the maximum value of the phase shift amount of the PPS signal of the RTC 25-2, respectively, to the control unit 40-2. The control unit 40-2 may detect abnormality of the RTCs 25-1 and 25-2 on the basis of these maximum values of the phase shift amounts, for example.

Figure 5:
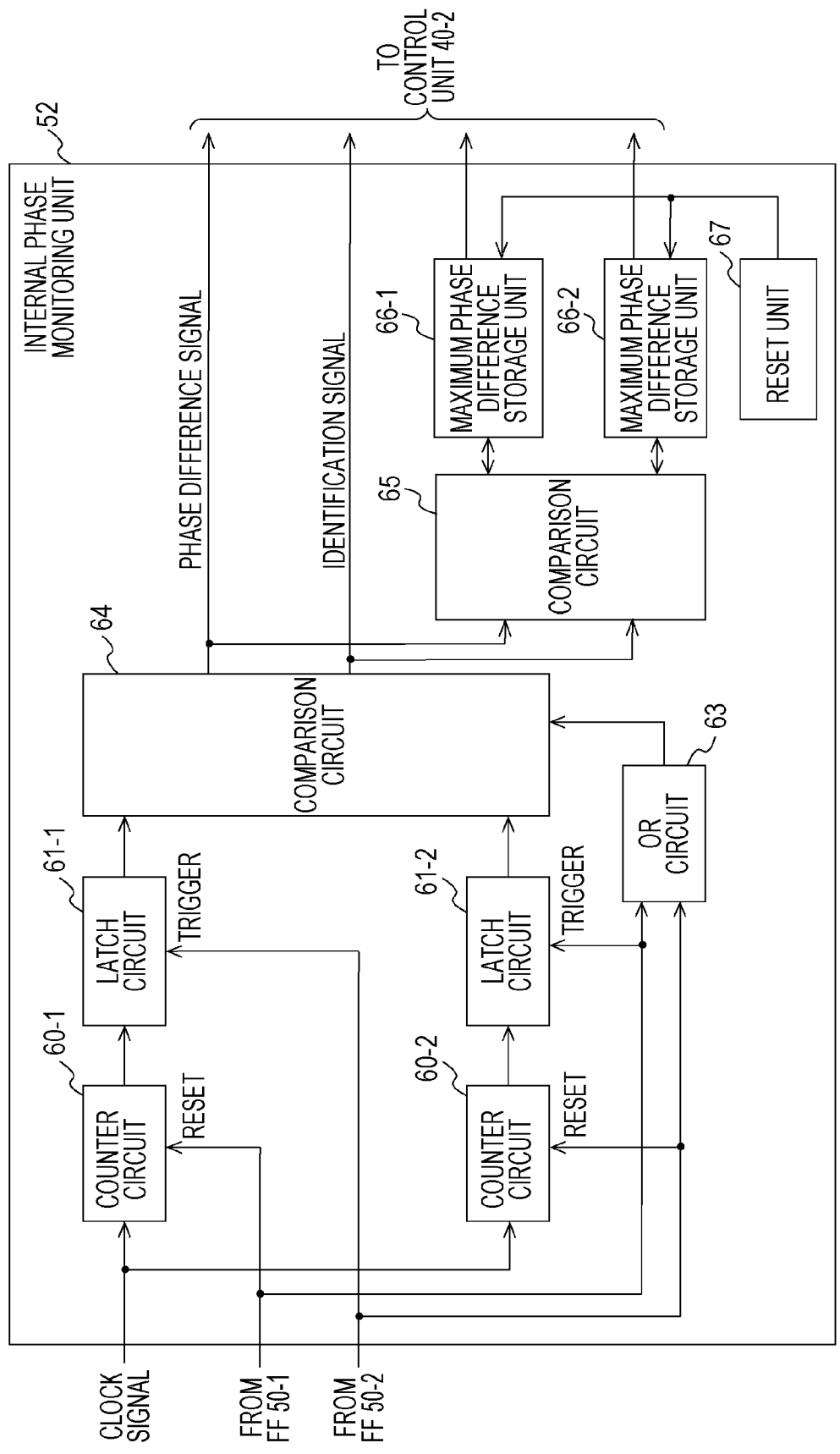
FIG. 5 is a diagram illustrating an example of a functional configuration of an internal phase monitoring unit, according to an embodiment.

FIG. 5 is a functional configuration diagram of an example of the internal phase monitoring unit 52. The internal phase monitoring unit 52 monitors a phase difference between the PPS signal of the RTC 25-1 and the PPS signal of the RTC 25-2. The internal phase monitoring unit 52 includes counter circuits 60-1 and 60-2, latch circuits 61-1 and 61-2, a logical addition (OR) circuit 63, comparison circuits 64 and 65, maximum phase difference storage units 66-1 and 66-2, and a reset unit 67. The maximum phase difference storage units 66-1 and 66-2 are examples of a storage unit.

The counter circuit 60-1 counts the pulse of a clock signal and a count value is reset at a rising edge of the PPS signal of the RTC 25-1. The latch circuit 61-1 latches the count value of the counter circuit 60-1 at timing on which a rising edge of the PPS signal of the RTC 25-2 is generated. Accordingly, the pulse number of a clock signal of a period from the rising edge of the PPS signal of the RTC 25-1 to the rising edge of the PPS signal of the RTC 25-2 is obtained as an output value of the latch circuit 61-1. This pulse number indicates a phase difference Δ1 from the rising edge of the PPS signal of the RTC 25-1 to the rising edge of the PPS signal of the RTC 25-2.

The counter circuit 60-2 counts the pulse of a clock signal and a count value is reset at a rising edge of the PPS signal of the RTC 25-2. The latch circuit 61-2 latches the count value of the counter circuit 60-2 at timing on which a rising edge of the PPS signal of the RTC 25-1 is generated. Accordingly, a phase difference Δ2 from the rising edge of the PPS signal of the RTC 25-2 to the rising edge of the PPS signal of the RTC 25-1 is obtained as an output value of the latch circuit 61-2.

The OR circuit 63 generates a trigger at timing of the rising edge of each of the PPS signal of the RTC 25-1 and the PPS signal of the RTC 25-2. The comparison circuit 64 latches outputs of the latch circuits 61-1 and 61-2 at timing of the generation of a trigger by the OR circuit 63.

The comparison circuit 64 selects the smaller phase difference between the phase differences Δ1 and Δ2 as a phase difference between current PPS signals. The comparison circuit 64 outputs a phase difference signal indicating the selected phase difference to the control unit 40-2. Further, the comparison circuit 64 outputs an identification signal indicating which phase difference between the phase differences Δ1 and Δ2 is selected, to the control unit 40-2.

The comparison circuit 65 receives the phase difference signal and the identification signal which are outputted by the comparison circuit 64. When receiving the phase difference Δ1, the comparison circuit 65 compares a phase difference which is stored in the maximum phase difference storage unit 66-1 with the phase difference Δ1. In the maximum phase difference storage unit 66-1, the maximum value, which has been previously outputted from the comparison circuit 64, of the phase difference from the rising edge of the PPS signal of the RTC 25-1 to the rising edge of the PPS signal of the RTC 25-2 is stored.

When the phase difference Δ1 which is received from the comparison circuit 64 is larger than the phase difference which is stored in the maximum phase difference storage unit 66-1, the comparison circuit 65 updates the phase difference which is stored in the maximum phase difference storage unit 66-1 with the phase difference Δ1. When the phase difference Δ1 which is received from the comparison circuit 64 is equal to or smaller than the phase difference which is stored in the maximum phase difference storage unit 66-1, the comparison circuit 65 does not update the phase difference which is stored in the maximum phase difference storage unit 66-1.

When receiving the phase difference Δ2, the comparison circuit 65 compares a phase difference which is stored in the maximum phase difference storage unit 66-2 with the phase difference Δ2. In the maximum phase difference storage unit 66-2, the maximum value, which has been previously outputted from the comparison circuit 64, of the phase difference from the rising edge of the PPS signal of the RTC 25-2 to the rising edge of the PPS signal of the RTC 25-1 is stored.

When the phase difference Δ2 which is received from the comparison circuit 64 is larger than the phase difference which is stored in the maximum phase difference storage unit 66-2, the comparison circuit 65 updates the phase difference which is stored in the maximum phase difference storage unit 66-2 with the phase difference Δ2. When the phase difference Δ2 which is received from the comparison circuit 64 is equal to or smaller than the phase difference which is stored in the maximum phase difference storage unit 66-2, the comparison circuit 65 does not update the phase difference which is stored in the maximum phase difference storage unit 66-2.

The maximum values of the phase differences which are stored in the maximum phase difference storage units 66-1 and 66-2 are read by the control unit 40-2. The reset unit 67 resets information which is stored in the maximum phase difference storage units 66-1 and 66-2 at operation start of the monitoring control board 12-2 or at predetermined timing.

The control unit 40-2 adjusts the frequency of the RTC 25-2 in accordance with the phase difference signal which is outputted from the comparison circuit 64, so as to synchronize the time of the RTC 25-2 with the time of the RTC 25-1. The control unit 40-2 may adjust the frequency of the RTC 25-2 in accordance with the following calculation expression (1), for example.

$$r(n)=r(n-1)+r(n-1)\times\alpha\times(\Delta t1-\Delta t0) \quad (1)$$

r(n−1) and r(n) respectively denote a frequency before adjustment of the RTC 25-2 and a frequency after the adjustment of the RTC 25-2, Δt1 denotes a phase difference at current time t1, Δt0 denotes a phase difference at time t0 which is previous time to time t1, and α denotes a coefficient for defining a correction response speed.

When the maximum values which are stored in the maximum phase difference storage units 66-1 and 66-2 are larger than a predetermined threshold value, the control unit 40-2 determines that correction of a frequency by the above formula (1) is inadequate. In this case, the control unit 40-2 may start adjustment processing of a coefficient α.

When the control unit 40-2 detects abnormality of the RTCs 25-1 and 25-2 on the basis of the maximum values of the phase shift amounts of the PPS signals of the RTC 25-1 and the RTC 25-2 which are outputted from the self-phase monitoring units 51-1 and 51-2, the control unit 40-2 may stop correction of a frequency by the above formula (1).

2. Description of Operation

Figure 6:
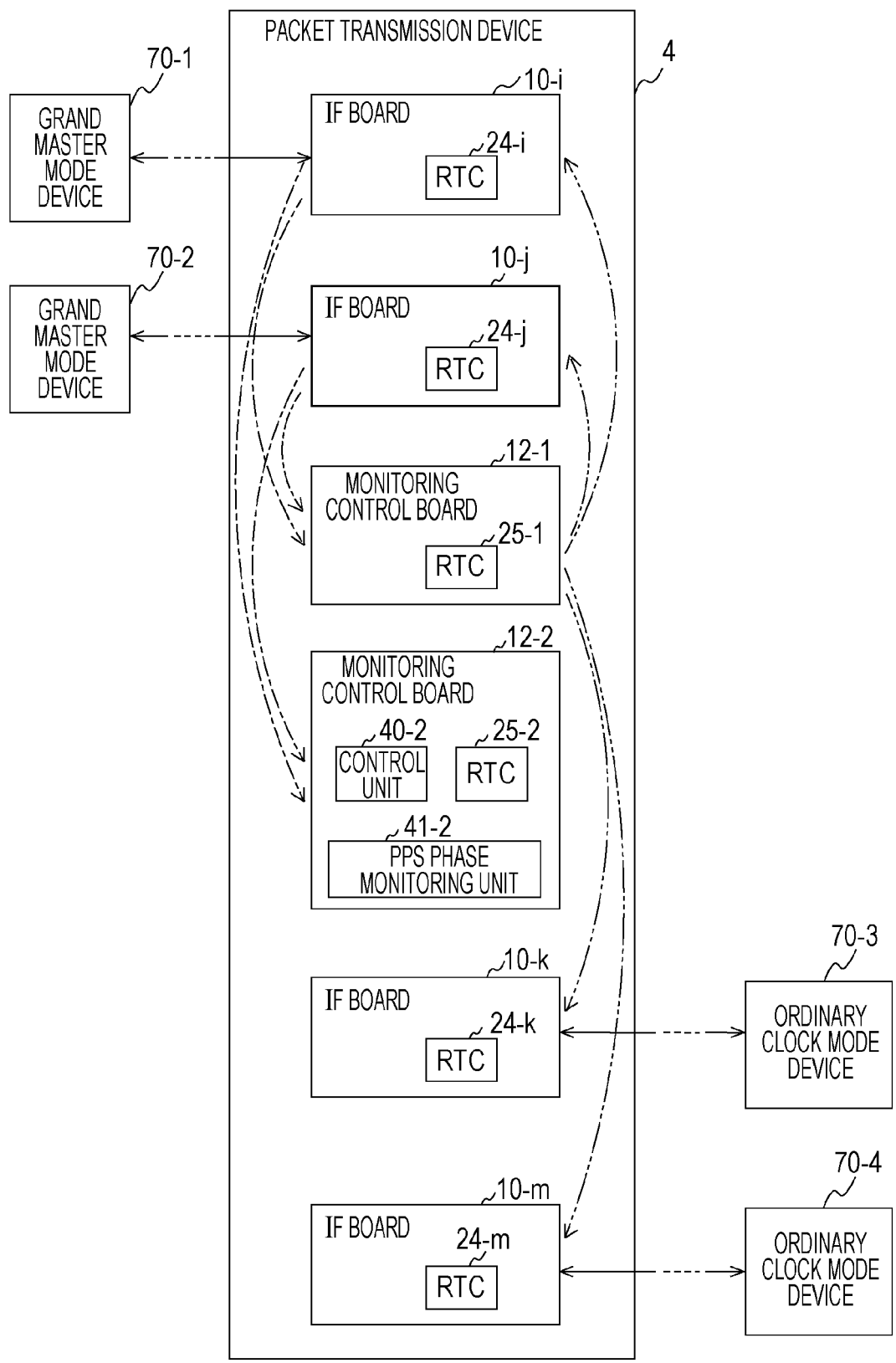
FIG. 6 is a diagram illustrating an example of an operation of a packet transmission device, according to an embodiment.

An operation example of the packet transmission device 4 is now described by using an exemplification of a case in which the packet transmission device 4 operates as a boundary clock mode device. FIG. 6 illustrates an example of an operation of the packet transmission device 4.

During a PTP synchronization state as a stationary state, the IF boards 10-i and 10-j respectively perform PTP packet communication with grand master mode devices 70-1 and 70-2 by the PTP slave peer operation so as to acquire timestamp information. The IF boards 10-i and 10-j transmit the acquired timestamp information to the active monitoring control board 12-1 and the standby monitoring control board 12-2. A dashed-dotted line of FIG. 6 represents a flow of the timestamp information.

The active monitoring control board 12-1 and the standby monitoring control board 12-2 execute the PTP software algorithm processing so as to synchronize the RTCs 25-1 and 25-2 with time of the grand master mode devices respectively. In this example, the IF boards 10-i and 10-j respectively perform PTP communication with the grand master mode devices 70-1 and 70-2, making a synchronization time source redundant.

The active monitoring control board 12-1 and the standby monitoring control board 12-2 select timestamp information which is transmitted from the active grand master mode device 70-1 between the grand master mode devices 70-1 and 70-2. The active monitoring control board 12-1 and the standby monitoring control board 12-2 synchronize the RTCs 25-1 and 25-2 with time of the grand master mode device 70-1 by using the selected timestamp information.

Due to the redundant configuration in which either one of the grand master mode devices 70-1 and 70-2 is selected as a synchronization time source, even if a failure of communication with either one of the grand master mode devices 70-1 and 70-2 occurs, the synchronization state is maintained by using the other master mode device.

The RTC 25-1 of the active monitoring control board 12-1 distributes TOD information and PPS signals to the IF boards 10-*i*, 10-*j*, 10-*k*, and 10-*m*. Accordingly, RTCs 24-*i*, 24-*j*, 24-*k*, and 24-*m* of the IF boards 10-*i*, 10-*j*, 10-*k*, and 10-*m* synchronize with the RTC 25-1. A dashed-two dotted line of FIG. 6 represents flows of TOD information and PPS signals.

The IF boards 10-*k* and 10-*m* respectively perform PTP packet communication with ordinary clock mode devices 70-3 and 70-4 by the PTP master peer operation, so as to perform network distribution of time synchronization.

In such PTP synchronization state, it is favorable that the RTC 25-2 highly accurately synchronizes with the RTC 25-1 so as to suppress quality degradation of the synchronization state in switching of the monitoring control board 12-2 into an active monitoring control board due to malfunction of the active monitoring control board 12-1. Accordingly, the PPS monitoring control unit 41-2 of the standby monitoring control board 12-2 monitors a phase difference between the PPS signals of the RTC 25-1 and the RTC 25-2. The control unit 40-2 adjusts the time and the frequency of the RTC 25-2 on the basis of the phase difference of the PPS signals.

Figure 7:
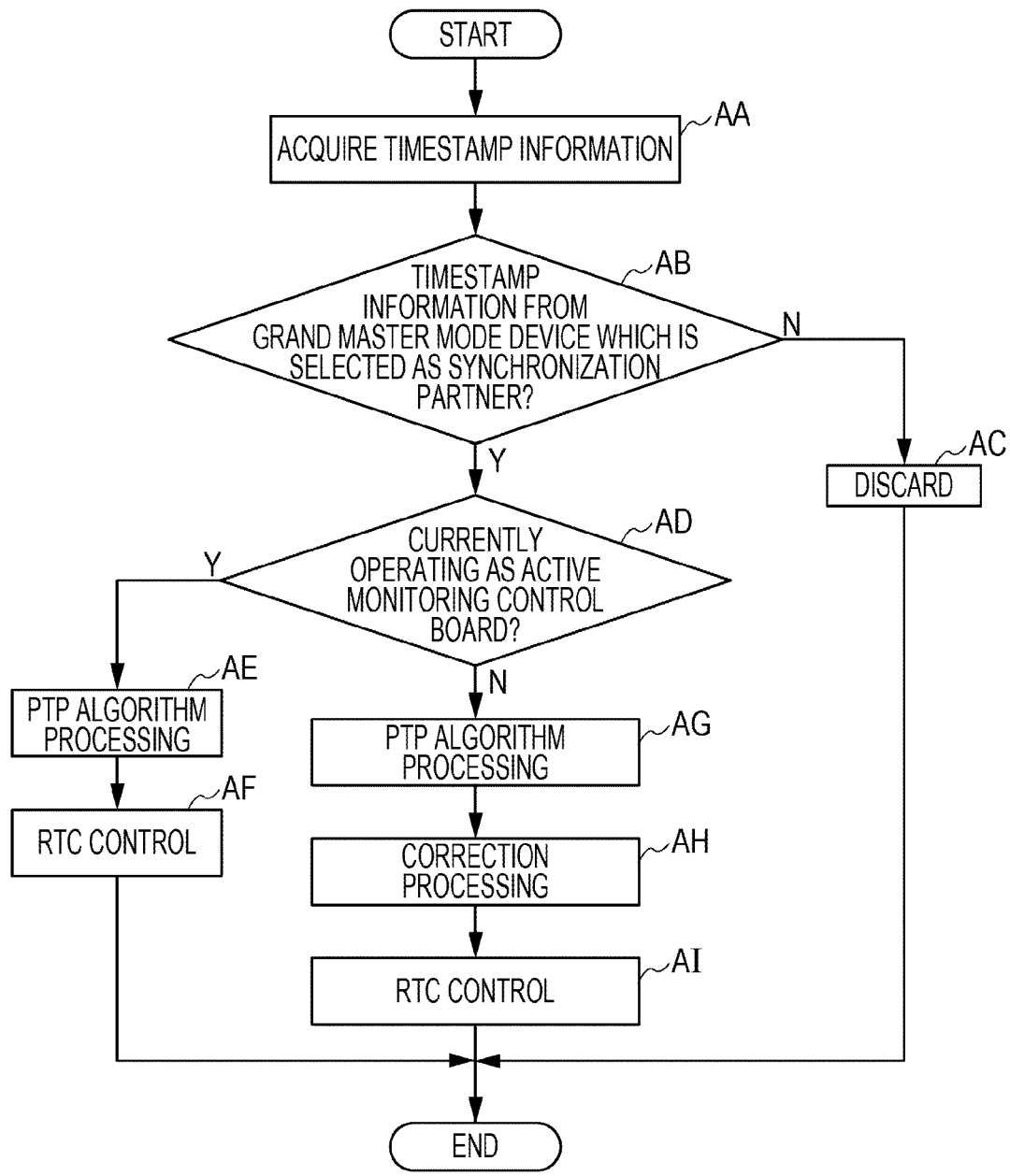
FIG. 7 is a diagram illustrating an example of an operational flowchart for a monitoring control board, according to an embodiment.

FIG. 7 illustrates an example of an operation of the monitoring control board 12-2 in acquisition of timestamp information. An operation of the monitoring control board 12-1 is same as the operation of the monitoring control board 12-2. A series of operations illustrated in reference to FIG. 7 may be interpreted as a method including a plurality of processes.

The control unit 40-2 acquires timestamp information from the IF boards 10-*i* and 10-*j* in operation AA. The control unit 40-2 determines whether or not the acquired timestamp information is timestamp information from the active grand master mode device 70-1 which is selected as a synchronization partner, in operation AB. When the acquired timestamp information is the timestamp information from the active grand master mode device 70-1 (Y in operation AB), the operation goes to operation AD.

When the acquired timestamp information is not the timestamp information from the active grand master mode device 70-1 (N in operation AB), the operation goes to operation AC. The control unit 40-2 discards the acquired timestamp information in operation AC. Then, the operation is ended.

In operation AD, the control unit 40-2 determines whether or not the monitoring control board 12-2 operates as an active monitoring control board. When the monitoring control board 12-2 operates as the active monitoring control board (Y in operation AD), the operation goes to operation AE. When the monitoring control board 12-2 operates as the standby monitoring control board (N in operation AD), the operation goes to operation AG.

In operation AE, the control unit 40-2 executes the PTP software algorithm processing in accordance with the acquired timestamp information. The control unit 40-2 adjusts the time of the RTC 25-2 in accordance with the result of the PTP software algorithm processing, in operation AF. Then, the processing is ended.

In operation AG, the control unit 40-2 executes the PTP software algorithm processing in accordance with the acquired timestamp information, so as to adjust the time of the RTC 25-2. In operation AH, the PPS phase monitoring unit 41-1 detects a phase difference between the PPS signals of the RTC 25-1 and the RTC 25-2 of the active monitoring control board 12-1. The control unit 40-2 decides a correction amount of the frequency of the RTC 25-2 on the basis of the phase difference between the PPS signals. In operation AI, the control unit 40-1 adjusts the frequency of the RTC 25-2 on the basis of the decided correction amount. Then, the processing is ended.

3. Advantageous Effect of Embodiment

According to the embodiment, the packet transmission device 4 has the redundant configuration including a plurality of monitoring control boards which respectively perform synchronization processing depending on the PTP. Accordingly, even if a failure occurs in any of the monitoring control boards which perform the synchronization processing in the packet transmission device 4, other monitoring control boards in the packet transmission device 4 are capable of continuing the synchronization processing. As a result, a failure recovery operation such as switching of an active system and a standby system is performed in the packet transmission device 4, thereby limiting an effect of the failure recovery operation to a local range.

According to the embodiment, it is possible to highly accurately synchronize a RTC of a standby monitoring control board with a RTC of an active monitoring control board. Accordingly, degradation of synchronization quality which may occur in switching of an active system and a standby system is reduced.

4. Second Embodiment

Figure 8:
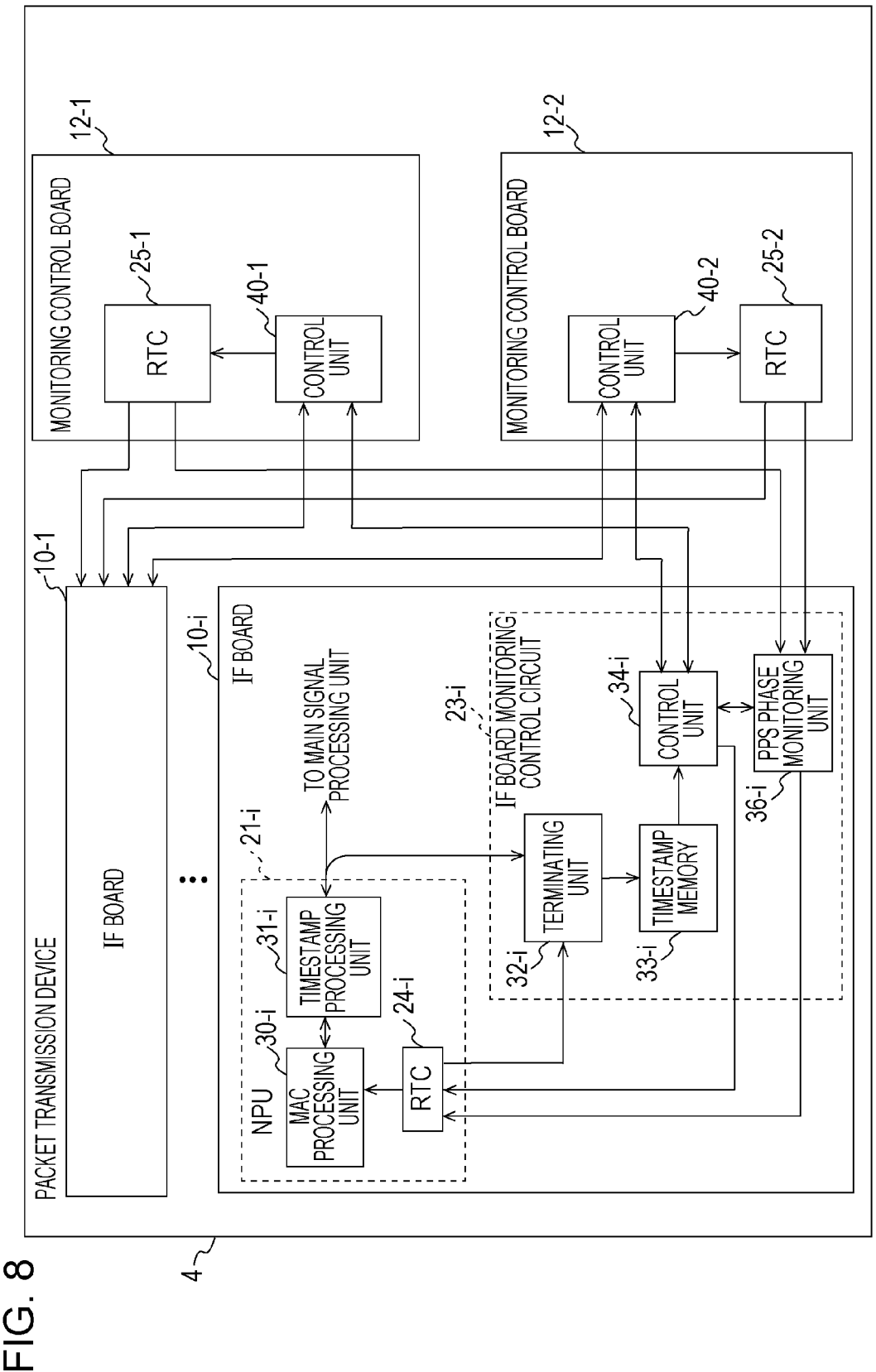
FIG. 8 is a diagram illustrating an example of a functional configuration of a packet transmission device, according to an embodiment.

FIG. 8 is a functional configuration diagram of a second example of the packet transmission device 4. Constituent elements same as the constituent elements of FIG. 3 are given reference characters same as the reference characters used in FIG. 3, and description of identical functions is omitted.

The IF board 10-*i* includes a PPS phase monitoring unit 36-*i*. The PPS phase monitoring unit 36-*i* detects the following values as is the case with the PPS phase monitoring unit 41-2 depicted in FIG. 3.

(1) Maximum value of a phase shift amount of a PPS signal of the RTC 25-1
(2) Maximum value of a phase shift amount of a PPS signal of the RTC 25-2
(3) Phase difference between PPS signals of the RTC 25-1 and the RTC 25-2
(4) Maximum value of the phase difference between the PPS signals of the RTC 25-1 and the RTC 25-2

The PPS phase monitoring unit 36-*i* outputs the above-mentioned values of (1) to (4) to the control unit 34-*i*. The control unit 34-*i* outputs the values of (1) to (4) to the control unit 40-2 of the standby monitoring control board 12-2. The control unit 40-2 adjusts time and a frequency of the RTC 25-2 on the basis of the values of (1) to (4). Adjustment of the time and the frequency of the RTC 25-2 performed by the control unit 40-2 may be same as that of the first embodiment described above.

Further, the PPS phase monitoring unit 36-*i* selects the PPS signal of the RTC 25-1 of the active monitoring control board 12-1 between the PPS signals of the RTC 25-1 and the RTC 25-2 so as to input the selected PPS signal into the RTC 24-*i*.

Figure 9:
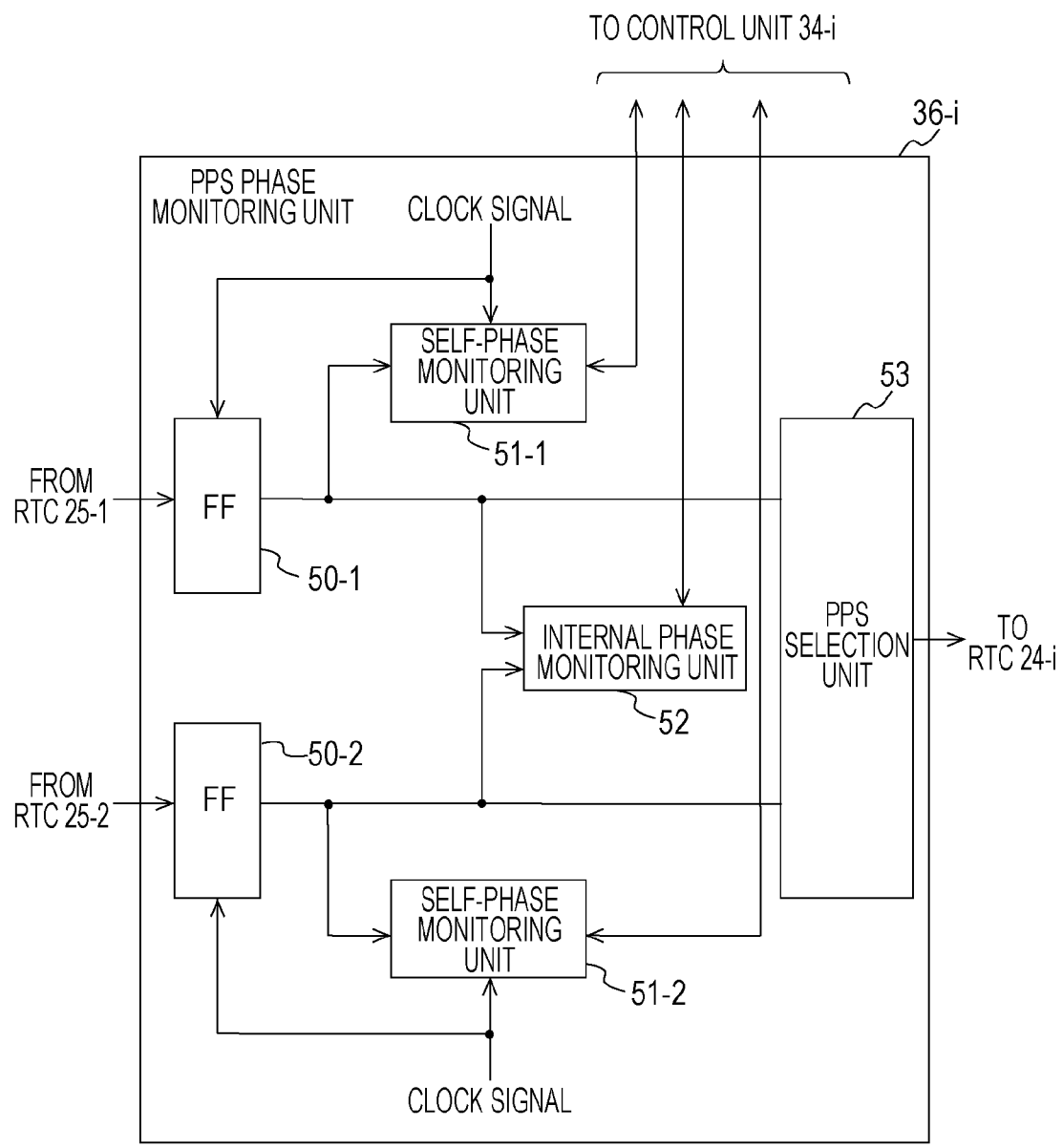
FIG. 9 is a diagram illustrating an example of a functional configuration of a PPS phase monitoring unit, according to an embodiment.

FIG. 9 is a functional configuration diagram of a second example of the PPS phase monitoring unit 36-*i*. Constituent elements same as the constituent elements of FIG. 4 are given reference characters same as the reference characters used in FIG. 4, and description of identical functions is omitted. The PPS phase monitoring unit 36-*i* includes a PPS selection unit 53. The PPS selection unit 53 selects the PPS signal of the RTC 25-1 of the active monitoring control board 12-1 between the PPS signals of the RTC 25-1 and the RTC 25-2 so as to input the selected PPS signal into the RTC 24-*i*.

According to the embodiment, it is possible to adjust the RTC 25-2 on the basis of a phase difference between the PPS signals of the RTC 25-1 and the RTC 25-2 which are detected at positions close to the NPU 21-*i* which performs timestamp processing. Accordingly, synchronization precision of a PPS signal which is supplied from the RTC 25-1 and the RTC 25-2 to the RTC 24-*i* of the NPU 21-I is improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A packet transmission device, comprising:
a first monitoring control board including a first clock, a first processor, and first circuits, the first circuits being configured to detect a first pulse per second (PPS) signal of the first clock;
a second monitoring control board including a second clock, a second processor, and second circuits, the second circuits being configured to detect a second PPS signal of the second clock; and
an interface (IF) board including a third processor configured to transmit and receive a synchronization packet to and from an external time source device; wherein
the first processor is configured to synchronize the first clock with the external time source device in accordance with time information of the synchronization packet;
the second processor is configured to synchronize the second clock with the first clock,
the first and second monitoring control boards are configured as a redundant configuration in which one of the first and second monitoring control boards is operated in an active mode and the other one of the first and second monitoring control boards is operated in a standby mode;
when the second monitoring control board is operated in the standby mode, the second circuits obtain a phase difference between the first PPS signal and the second PPS signal, the phase difference indicating a pulse number of a clock signal of a period from a rising edge of the first PPS signal to a rising edge of the second PPS signal, and the second processor synchronizes the second clock with the first clock of the first monitoring control board in the active mode by adjusting the second clock in accordance with the phase difference between the first clock and the second clock obtained by the second circuits; and
when a failure occurs in the first monitoring control board that is operating in the active mode, the second processor of the second monitoring control board which has been operating in the standby mode, causes the second monitoring control board to operate in the active mode by using the second clock that has been adjusted in accordance with the phase difference obtained by the second circuits.

2. The packet transmission device of claim 1; wherein
the IF board further includes
a third clock configured to synchronize with the first clock, and third circuits configured to detect the first PPS signal of the first clock and the second PPS signal of the second clock;
the third processor of the IF board is configured to perform timestamp processing on the synchronization packet on the basis of time of the third clock;
the third circuits are configured to detect a phase difference between the first PPS signal of the first clock and the second PPS signal of the second clock; and
the second processor of the second monitoring control board is configured to adjust the second clock in accordance with the phase difference detected by the third circuits.

3. The packet transmission device of claim 1; wherein
the second circuits includes a storage configured to store a maximum value of the phase difference; and
the second processor of the second monitoring control board adjusts the second clock in accordance with the maximum value.

4. The packet transmission device of claim 1, wherein
the third processor is configured to:
monitor a phase fluctuation amount of the first PPS signal;
monitor a phase fluctuation amount of the second PPS signal, and
stop adjustment of the second clock in accordance with the phase fluctuation amount of the first PPS signal and the phase fluctuation amount of the second PPS signal.

5. A synchronization method, comprising:
transmitting and receiving a synchronization packet between an external time source device and a packet transmission device;
synchronizing a first clock in a first monitoring control board of the packet transmission device with the external time source device in accordance with time information of the synchronization packet;
synchronizing a second clock in a second monitoring control board of the packet transmission device with the first clock;
configuring the first and second monitoring control boards as a redundant configuration in which one of the first and second monitoring control boards is operated in an active mode and the other one of the first and second monitoring control boards is operated in a standby mode;
providing the first monitoring control board with the first circuits configured to detect a first pulse per second (PPS) signal of the first clock;
providing the second monitoring control board with second circuits configured to detect a second PPS signal of the second clock;

when the second monitoring control board is operated in the standby mode, causing the second circuits of the second monitoring control board to obtain a phase difference between the first PPS signal and the second PPS signal, the phase difference indicating a pulse number of a clock signal of a period from a rising edge of the first PPS signal to a rising edge of the second PPS signal, and causing the second monitoring control board to synchronize the second clock with the first clock of the first monitoring control board in the active mode by adjusting the second clock in accordance with the phase difference between the first clock and the second clock obtained by the second circuits; and when a failure occurs in the first monitoring control board that is operating in the active mode, causing the second monitoring control board which has been operating in the standby mode, to operate in the active mode by using the second clock that has been adjusted in accordance with the phase difference obtained by the second circuits.

* * * * *